United States Patent [19]
Fontana et al.

[11] Patent Number: 5,848,273
[45] Date of Patent: *Dec. 8, 1998

[54] METHOD FOR GENERATING OLE AUTOMATION AND IDL INTERFACES FROM METADATA INFORMATION

[75] Inventors: James Albert Fontana, Mission Viejo, Calif.; Srinivasan Govindarajan, Austin, Tex.

[73] Assignee: Unisys Corp., Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 549,352

[22] Filed: Oct. 27, 1995

[51] Int. Cl.⁶ ........................................................ G06F 9/45
[52] U.S. Cl. .................... 395/701; 395/682; 395/200.33; 707/100
[58] Field of Search .................... 395/701–703, 395/682, 685, 614, 200.31, 200.32, 200.33, 610, 604; 707/103, 100

[56] References Cited

U.S. PATENT DOCUMENTS

| | | | |
|---|---|---|---|
| 5,493,680 | 2/1996 | Damforth | 395/700 |
| 5,517,645 | 5/1996 | Stutz et al. | 395/700 |
| 5,581,755 | 12/1996 | Koerber et al. | 395/614 |
| 5,644,764 | 7/1997 | Johnson et al. | 395/614 |

*Primary Examiner*—Emanuel Todd Voeltz
*Assistant Examiner*—Kakali Chaki
*Attorney, Agent, or Firm*—J. Ronald Richebourg; Mark T. Starr; Steven R. Petersen

[57] ABSTRACT

A method in a repository coupled to a computer system that generates OLE automation and Interface Definition Language ("IDL") interfaces from metadata (i.e., information about data). Visual Basic programming language is used to develop a tool that generates the automation binding from the metadata in the repository. The method extends C++ programming language binding across networks, independent of the Object Request Broker (ORB) being used. A schema is provided that maps the types and features of a repository to OLE automation and member functions for Windows. The method also integrates the Application Programming Interface (API) of a repository with Windows scripting programming languages through Object Linking and Embedding (OLE).

15 Claims, 11 Drawing Sheets

METHOD FOR GENERATING OLE AUTOMATION AND IDL INTERFACES FROM METADATA INFORMATION

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of and Object Linking and Embedding ("OLE") automation programming in general and in particular to a method for generating OLE automation and IDL interfaces from metadata information that describes the interface.

BACKGROUND OF THE INVENTION

The present invention will be described in the context of interfacing a repository with a client executing the Windows operating system. However, as will become evident from the description hereinbelow, the present invention has much broader applications and is to be limited in scope only by the breadth of the Claims appended hereto.

A repository enables the user to store, manage, share and reuse information about the enterprise in which the repository is used. A repository not only uses a database as a data store, but is a layer above a database. A repository has information about the things stored in the database. Stated otherwise, a repository is like a card catalog that is found in the library, with the library being analogous to a database. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of that information.

Examples of definition information might include the files and programs that form a salary administration application. This application might define the minimum and maximum salaries at a given level. Another example is management information used to manage and maintain definition information. Management information also describes who can use definition information when, where and why the information is used. For example, the salary administration application might be accessible only to a select group of repository users. Yet another example is operational information about the environment in which the user operates. Examples of this information include system configuration, backup information and schedules.

Urep (or Universal Repository) is a repository program available from the assignee hereof that enables an enterprise to store, process, maintain, control, reuse and share information about information systems. An enterprise is defined to be an organization that operates one or more communication networks with consistent policies to meet common objectives. Urep can contain definitional information, management information and operational information about the enterprise. The Urep product provides the features of object-oriented technology; an extensible information model (with user defined subclasses and user written methods); a set of services available through an API; interoperability across platforms; support for industry standards; graphical tools for designing models and viewing repository objects; and a framework for defining and managing reusable software components.

An object is an abstract representation of a real-world concept or thing—such as a person, a software package, or an event—that is stored in the repository. In the repository, the state of an object is represented by the values of the properties defined for the type. For example, the state of an integer is its numeric value. The state of a person is their name, birthdate, spouse and so on.

The behavior of an object is the set of functions that the object can perform. In the repository, the behavior of an object is represented by the operations defined for the owner type. A characteristic of object behavior is the ability to return some of its state to a requester. For example, the object "person" can return its name. For this reason, some object models describe object behavior as the set of messages that an object can receive and respond to. One example of object behavior is the capability an integer has to perform such functions as addition, square root and absolute value.

OLE Automation allows a user to create applications that expose objects to programming tools and macro languages, to create and manipulate objects exposed in one application from another application and to create tools that access and manipulate objects (such as embedded macro languages and object browsers). Object databases provide OLE programs with the ability to define persistent objects. Persistent objects remain in existence even after the program stops running, whereas transient objects remain in existence only so long as the program is running. The same program, or even another program, can access the persistent objects at a later time.

Object Request Brokers ("ORB") are intended to provide language independent interoperable software components. Each ORB has its own unique way to declare objects and to access the data within those objects. A variety of ORB's are readily available on the market. The Orbix ORB, supplied by Iona Technologies, Ltd. of Dublin, Ireland, was used in one embodiment of the present invention.

BRIEF SUMMARY OF THE INVENTION

It is therefore an object of the present invention to provide a method that generates OLE automation and Interface Definition Language ("IDL") interfaces from metadata (i.e., information about data).

Another object of the present invention is to provide for the use of Visual Basic programming language to develop a tool that generates the automation binding from the metadata in the Urep.

It is yet another object of the present invention to extend C++ programming language binding across networks, independent of the Object Request Broker (ORB) being used.

Still another object of the present invention is to provide a schema that maps the types and features of a repository to OLE automation and member functions for Windows.

Another object of the present invention is to integrate the Application Programming Interface (API) of a Universal Repository (Urep) with Windows scripting programming languages through Object Linking and Embedding (OLE).

The present invention is useful in a computer system having a server including a CPU and a memory, a client including a CPU and a memory and a local area network connected therebetween. More particularly, the present invention is a program operating in either the client or the server for generating OLE automation in the client and IDL interfaces for each of the server and the client. The program executed is a method comprising the steps of generating IDL from metadata information; generating OLE automation from IDL independently of ORB and involving ORB in an independent manner; and, generating server software from IDL.

The foregoing and other objects, features and advantages of this invention will become apparent from the following more particular description of an embodiment of the present invention, as illustrated in the accompanying drawings in which like reference numerals refer to the same components throughout the different views. The drawings are not necessarily to scale, emphasis instead being placed upon illustrating the principles of the invention.

DETAILED DESCRIPTION

Background information regarding the present invention may be had by reference to U.S. Pat. No. 5,644,764, entitled A METHOD FOR SUPPORTING OBJECT MODELING IN A REPOSITORY; and a co-pending patent application Ser. No. 08/505,140, entitled A METHOD FOR PROVIDING OBJECT DATABASE INDEPENDENCE IN A PROGRAM WRITTEN USING THE C++ PROGRAMMING LANGUAGE, respectively, both of which are assigned to the same assignee hereof.

Figure 1:
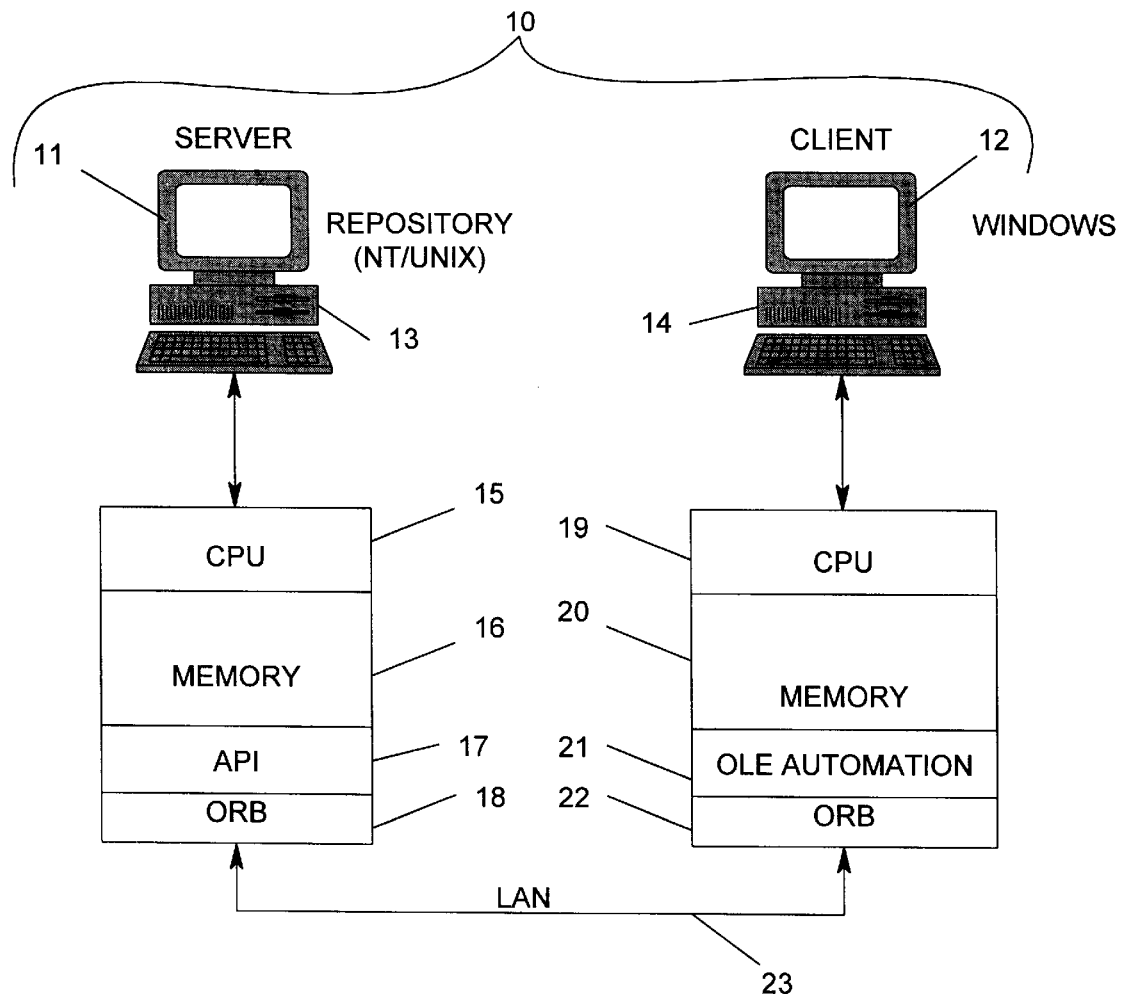
FIG. 1 is a generalized block diagram of a client-server system that may use the method of the present invention.

Referring now to the drawings and FIG. 1 in particular, a block diagram is shown of a client-server network 10 including a server system 11 typically executing either NT or UNIX operating systems and a repository program being executed thereby (e.g., Urep); and a client 12 system typically executing Windows operating system. Each system 11 and 12 includes a console 13 and 14, respectively. The server system 11 includes a CPU 15 and a memory 16, which has stored therein an Application Programming Interface (API) 17 and an Object Request Broker (ORB) 18. The client system 12 includes a CPU 19, and a memory 20 having stored therein Object Linking and Embedding (OLE) 21 and an ORB 22, which will be explained further hereinafter. The systems 11 and 12 are coupled together to form the network 10 by means of a Local Area Network (LAN) 23 (or via the Internet).

An object has features, which can be either an operation or a property. An operation defines an action that an object can perform, or an action that can be performed on the object. For example, "make withdrawal" could be defined as an operation on a banking account object. Properties indicate the state of an object. Every property of an object has a value, and it is the property values that define the state of the object. A property can be either an attribute or a reference. An attribute defines a value that is stored within the object. For example, "current account balance" could be an attribute of the banking account object. The numeric value for the banking account balance would be stored in the banking account object. A reference is a link or pointer to another object, and implies a relationship to that other object. A reference is typically used when it is desired not to duplicate data.

Figure 2:
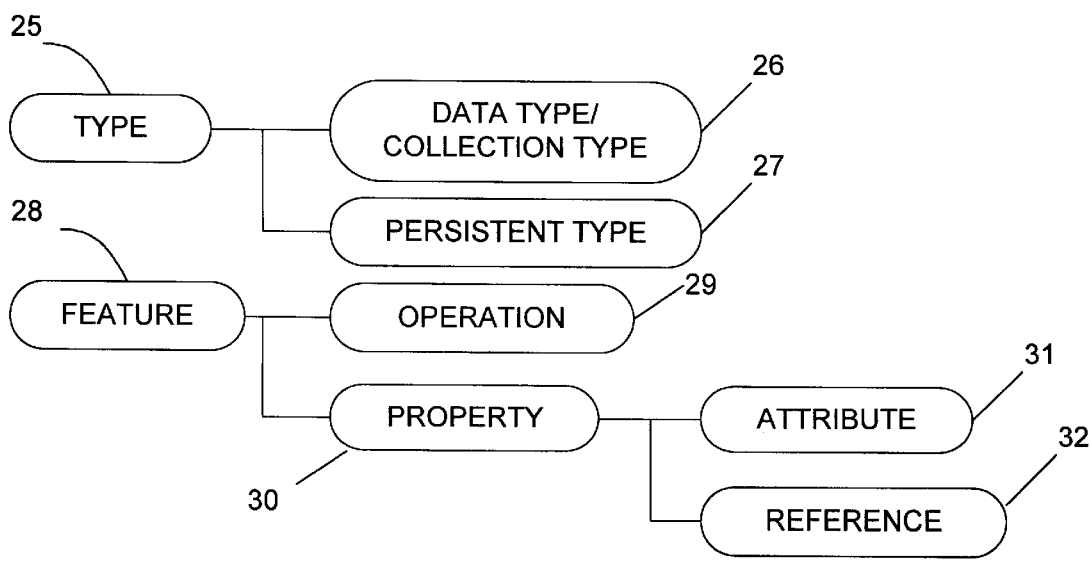
FIG. 2 is a chart amplifying the breakdown of elements of a schema into types and features, and their constituents.
Figure 3:
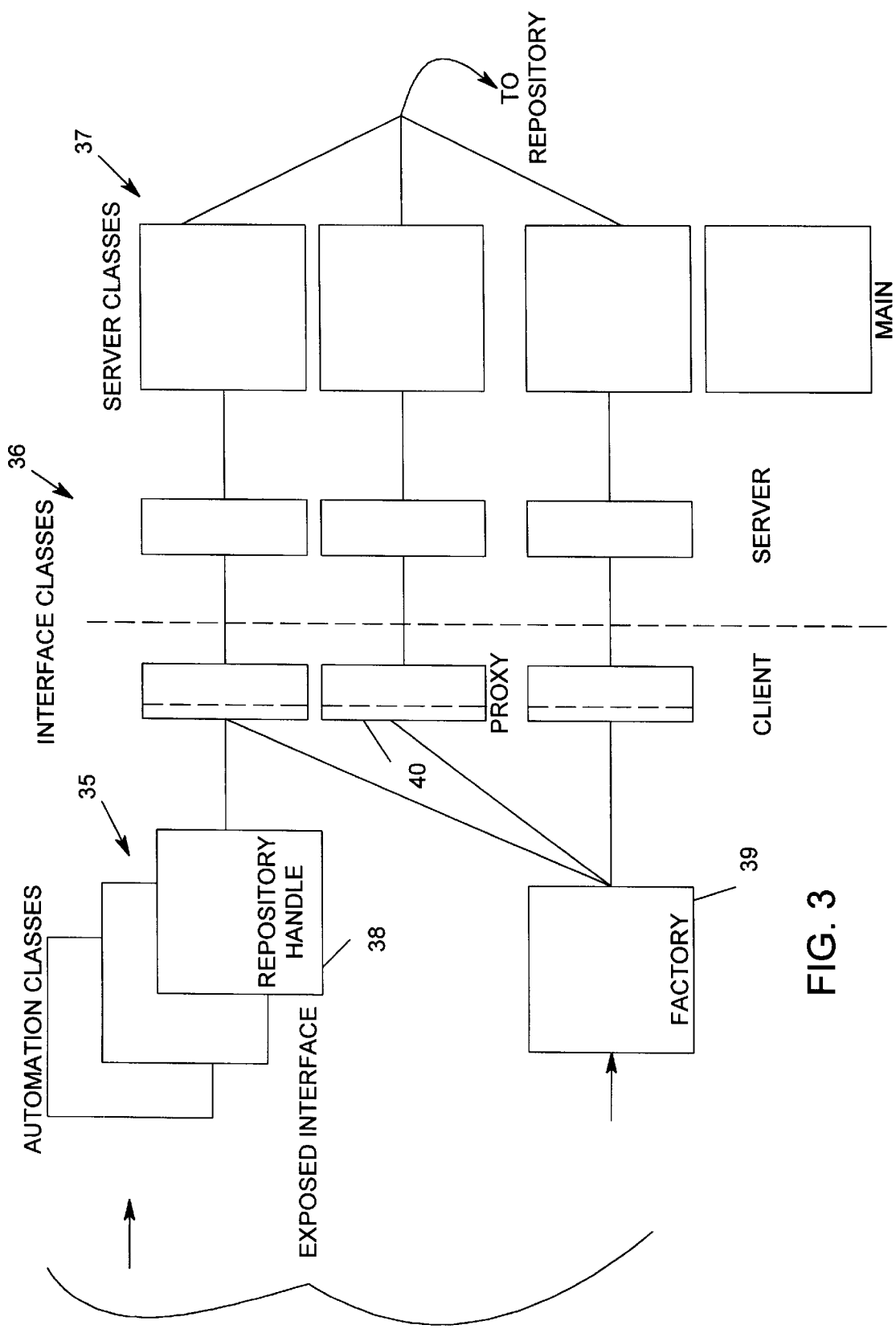
FIG. 3 is a schematic diagram illustrating the relationship of the resulting code generated by the method of the present invention in both the client and server.

With reference to FIG. 2, the object types of the repository schema (also known as a model) are shown. A type 25 is a template that describes a set of features (the state and behavior) that an object or another type can possess. A type 25 defines a pattern that can be used to create or identify objects; it does not contain the actual object. A repository schema is defined by a hierarchy of data types/and collections 26 (also referred to as transient types) and persistent object types 27. Transient types 26 and collections define values of attributes stored in a repository. Next are features 28 which are categorized into operations 29 or properties 30. A feature defines some element of either the state or the behavior that objects can possess. A feature is defined for a type, but applied to the corresponding objects. In other words, a type defines the layout of the data for the objects, and objects are instances of the type. Properties define a state. For example, the salary feature is a property that defines an employee's current salary. Operations define behavior. For example, the setsalary feature is an operation that defines the mechanism for changing an employee's salary. The properties 30 are categorized as attributes 31, whose values are embedded and access to persistent objects must occur only during a transaction Referring now to FIG. 3, a diagram of a typical client-server architecture is schematically illustrated as comprising three parts: Automation Classes 35, Interface Classes 36 and Server Classes 37. Automation Classes 35 expose the server API 17 to OLE automation 21. Interface Classes 36 provide the ORB interoperability interface. Server Classes 37 provide the connection from the network to the repository using the native API of the repository.

For each class in the repository model, there is a corresponding Automation Class, Interface Class and Server Class. All classes follow the class hierarchy of the model and contain the same methods as the class in the repository. Method inheritance is supported. The differences come during method execution. For each object created by the client application, a corresponding automation class is instantiated. Only one interface object is instantiated, however, and only when the first Automation Class is instantiated. The Interface Class 36 is used by the Automation Class 35 to communicate with the server 11.

When created, each automation object contains a handle 38 of the corresponding object in the language-binding table on the server 11. The handle 38 is passed to the server 11 with most of the methods.

Two interfaces are generated that do not correspond to classes in the repository: the Factory Interface 39 and the Proxy Interface 40. The Factory Interface 39 exposes class creation functions and persistent object casting functions to the client application and is the starting point for client automation calls. Class creation functions correspond to C++ constructors, with construction performed on both the client 12 and the server 11. The Factory Interface 39 gets things started by providing the first OLE dispatch pointer to the client program. A dispatch pointer is a pointer to an interface (a table of function pointers), allowing OLE automation to access the methods of that interface.

Each model Factory has a Globally Unique Identifier (GUID) that is registered in the OLE registration database along with a textual name. The client application needs only to create an object of that name to bring up the client side automation server (left side of FIG. 3). Using the dispatch pointer obtained from the Factory 39, the client application can then create repository objects and access the API 17. When the factory is brought up on the client 12, it "binds" to its corresponding server program, starting it running (one server program for each client application). This "binding" is handled by the ORB. Depending on the ORB used, the server 11 may or may not time out the client 12. If the client crashes and does not disconnect properly, the server may remain running until the client 12 restarts Windows. Calls appear synchronous to the caller, but are asynchronous and do not lock out the client 12.

The Proxy Class 40 is responsible for making instances of Interface Classes. The Factory 39 makes a Proxy object and a Proxy interface object on startup. Each method call for an Automation Class checks to see if the corresponding interface class has been initialized and, if not, asks the Proxy Class to initialize it. The Proxy Class interface is not exposed to the client application.

Generation of Interfaces

Generation is performed on the client 11 with a Visual Basic program. To generate a model, one opens the repository desired and then selects the model to generate. First, an IDL file is generated from the metadata in the repository. Attributes, operations and references are turned into IDL methods. Next, the program runs the vendor-supplied IDL compiler to generate the code for the interface classes and the server skeleton (a framework provided for filling in the server side implementation of the method).

Next the Automation Classes are generated primarily from the IDL with a few calls to the metadata. After this, the server skeleton is altered (it is different than if it was generated using the server IDL compiler) and the methods are filled in with the correct native repository API call. A server main program is also generated. This completes generation. The user can select IDL or automation classes or server code to be generated and can select a subset of the API to generate (in order to save time when the model changes). To make a server executable, the IDL file and the server source files must be copied to the server machine and the IDL compiler run on the server to create the server-side interface classes.

Figure 4:
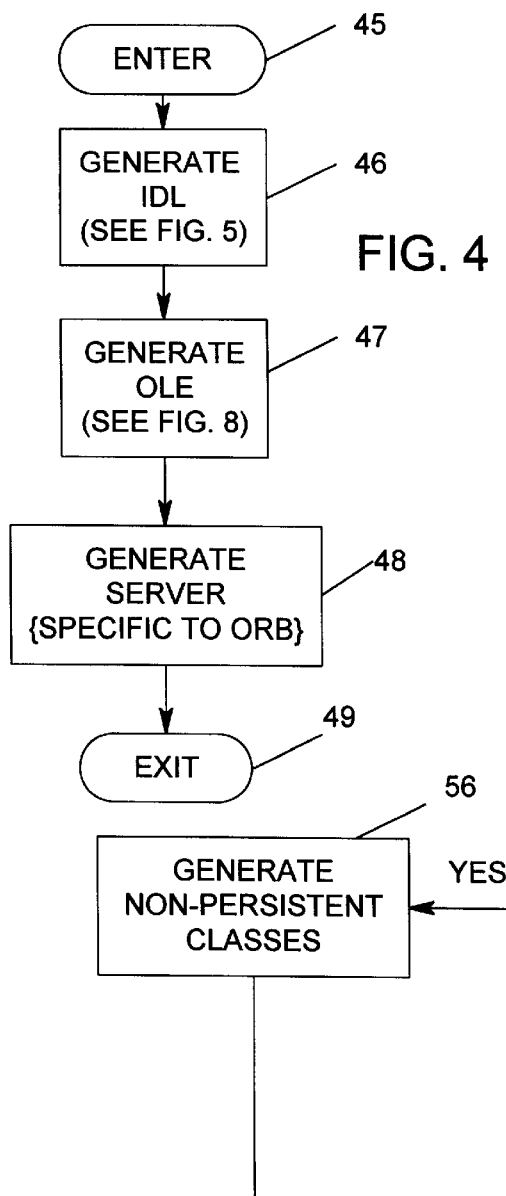
FIG. 4 is an overall flow chart of the method of the present invention.
Figure 8:
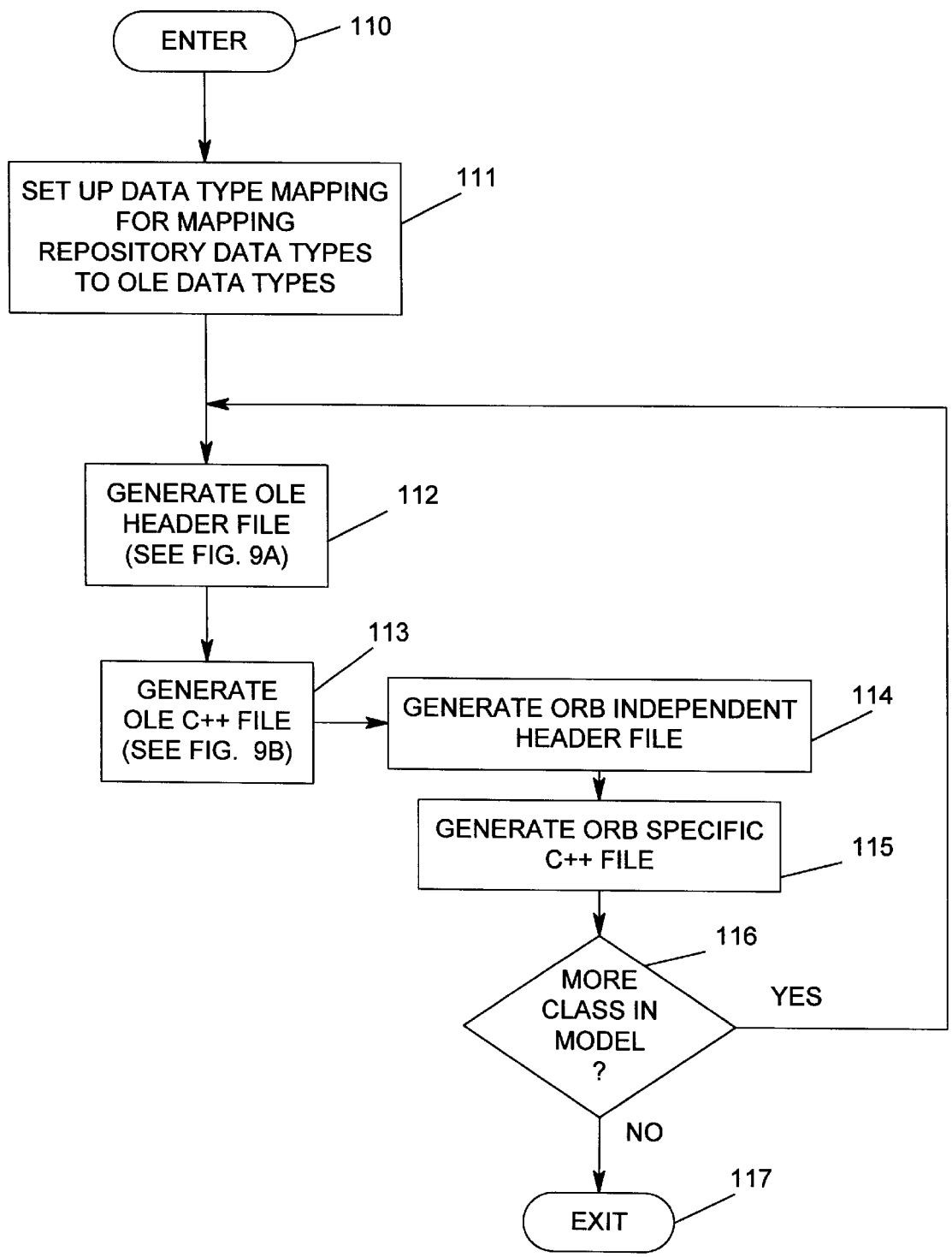
FIG. 8 is a flow chart illustrating the routine to generate OLE data types.

Referring now to FIG. 4, an overall flow chart of the method of the present invention is illustrated. The process begins with an enter bubble 45, followed by a step of generating IDL (i.e., the language used to communicate between the client and server) as depicted by a process block 46. The IDL is generated from the metadata within the repository 11. This step will be described in greater detail hereinbelow in conjunction with a description of FIG. 5. Next, a step of generating OLE from the IDL is performed as depicted by a process block 47, the details of which are illustrated in FIG. 8 and described further hereinafter. After this, a step of generating server software is performed as depicted by a process block 48. This step is specific to the ORB employed, and is explained in greater detail in the above-cited U.S. Pat. No. 5,644,764 entitled A METHOD FOR SUPPORTING OBJECT MODELING IN A REPOSITORY, and the co-pending patent application Ser. No. 08/505,140, entitled A METHOD FOR PROVIDING OBJECT DATABASE INDEPENDENCE IN A PROGRAM WRITTEN USING THE C++ PROGRAMMING LANGUAGE.

Figure 5:
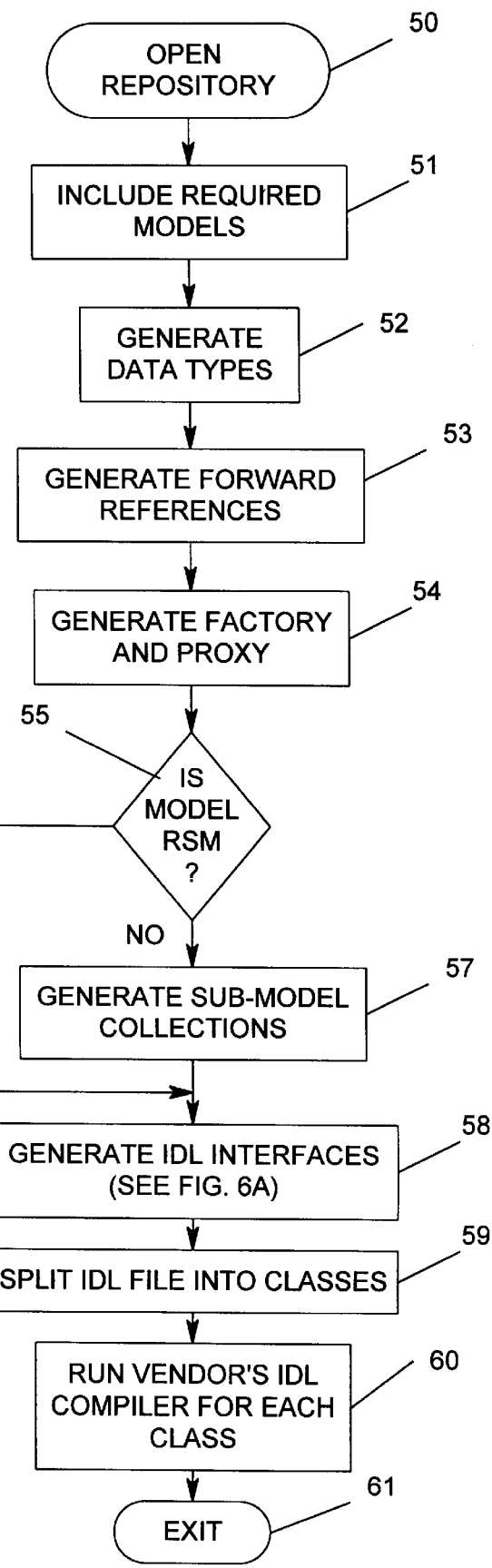
FIG. 5 is a flow chart of the generate IDL routine.

Referring now to FIG. 5, the routine of generating IDL is illustrated, which routine begins with opening the repository (bubble 50). Next, the process determines which models to look at (process block 51). There are many models in the repository, and one may be dependent on another. The process also determines such dependency relationships. Following this, data types are generated (process block 52). The data types are strings and enumerations of data types to be used by the interface. Next, forward references are generated (process block 53). Forward references predefine all interfaces to allow any interface to be referenced by any other interface. Factory and Proxy interfaces are next generated (process block 54), which are two interfaces required by the repository to allow the user to start and communicate with the repository.

An inquiry is next made as to whether or not the model is a Repository Service Model ("RSM", decision diamond 55), which is the predefined model that is a part of the Urep from which all other models are derived. If the model is an RSM, then non-persistent classes (classes which are not part of the metadata) are generated (process block 56). Non-persistent classes are datatypes, collections and administrative classes necessary to operate the repository, but are only active when the repository is opened and in use. If the model is not an RSM, the sub-model collections are generated (block 57). Collections are lists, sets or arrays of objects which can be accessed one after the other. Following this, the IDL interfaces for the classes in the model are generated (block 58). This step is detailed in FIG. 6A, and will be described further hereinafter. As a result of this step, an ASCII text file that describes the interface is created. This file is capable of being compiled by any vendor's IDL compiler, which will generate code and will allow the client 12 to communicate with the server 11. Next, the IDL file is split into classes since it is a very large file and produces code too big to compile, which step is depicted by a process block 59. Each class thus becomes a separate file. The next step of the process is to run an IDL compiler for each class, as depicted by a process block 60. The process is then exited, bubble 61. Separating the main IDL file into classes facilitates partial re-generation if the model changes in the future.

Figure 6A:
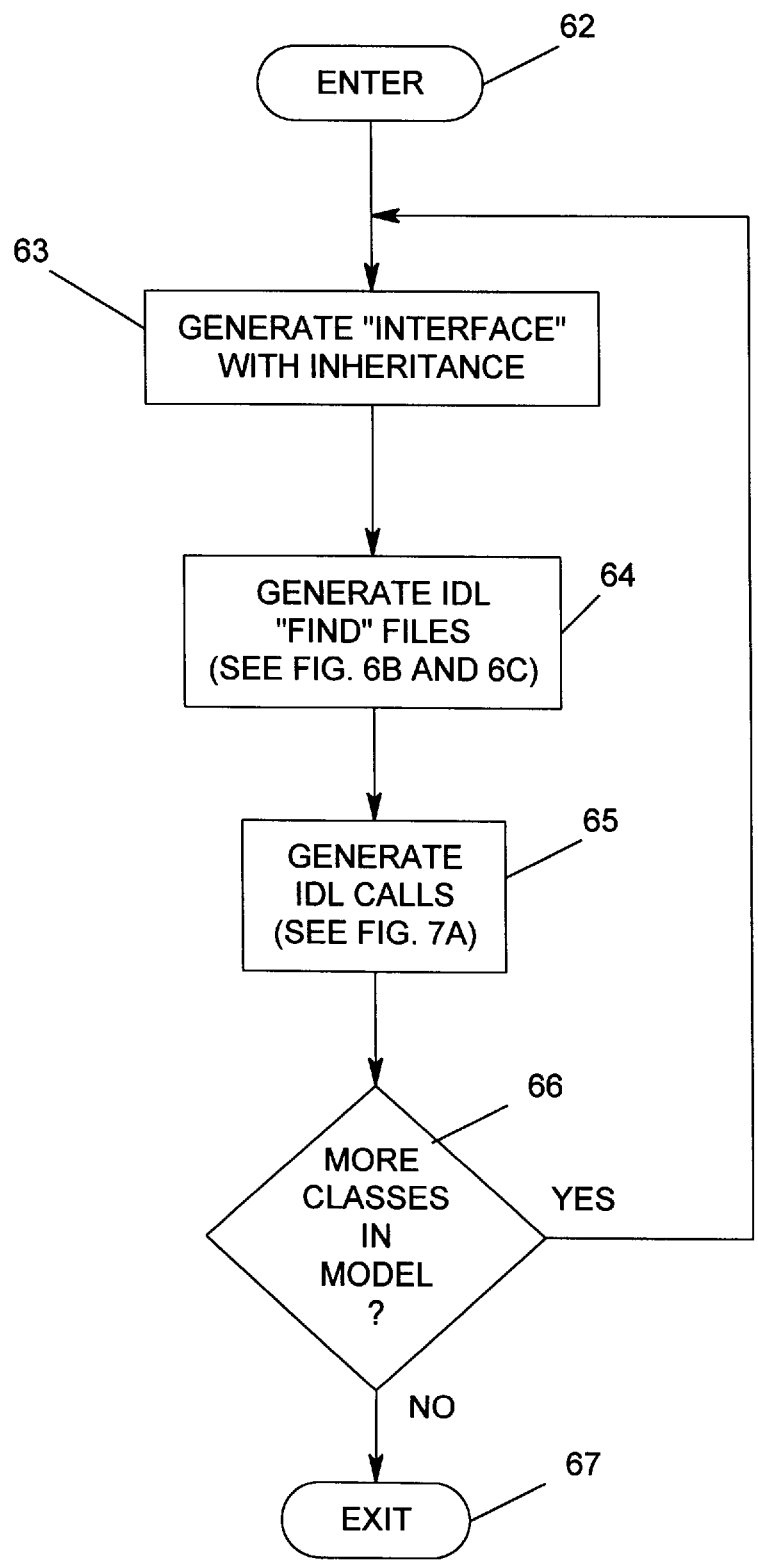
FIG. 6 is a flow chart illustrating the routine to generate IDL interfaces.
FIGS. 6B and 6C combined form a flow chart illustrating the routine to generate IDL "find" files.
Figure 6B:
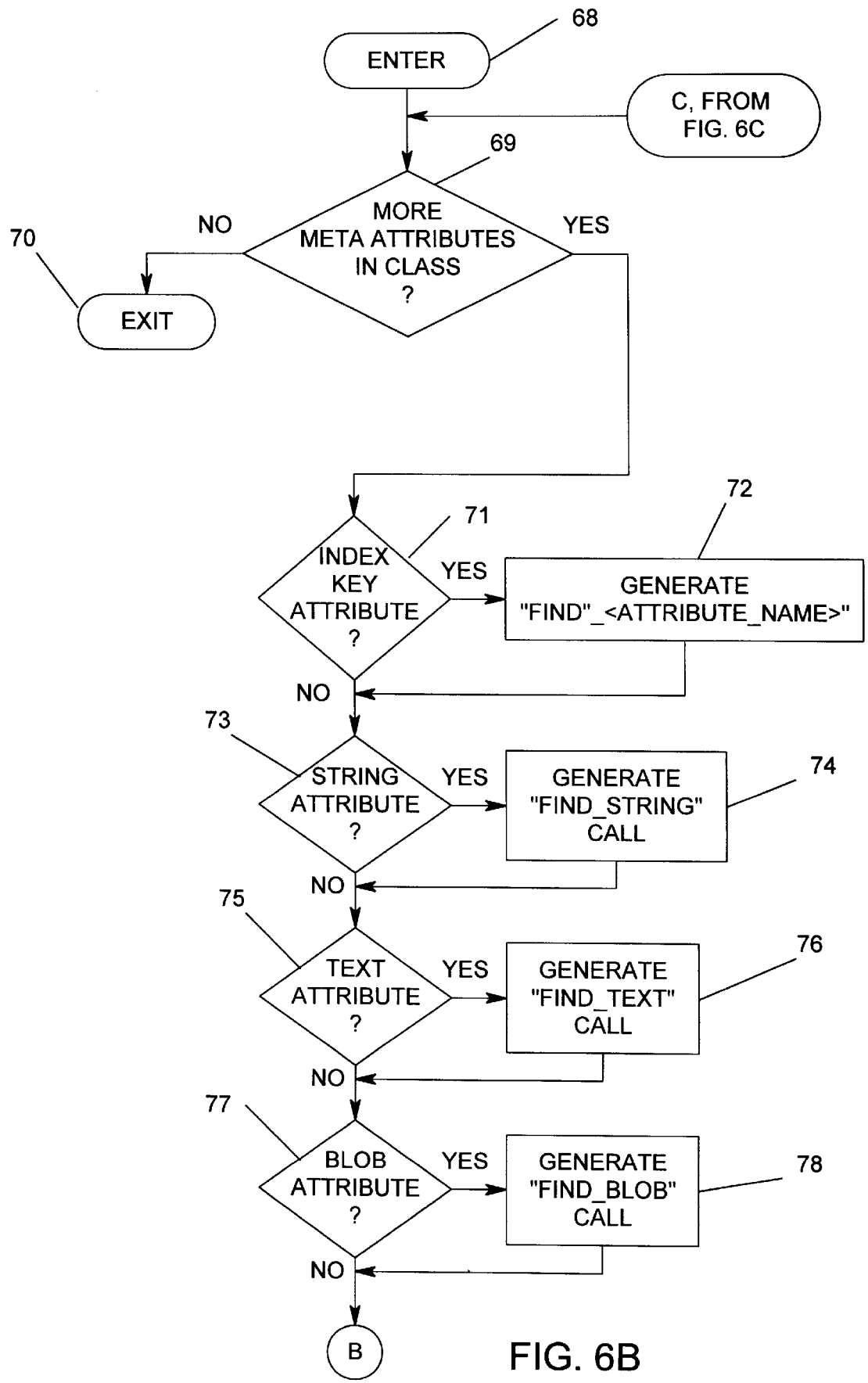
Figure 7A:
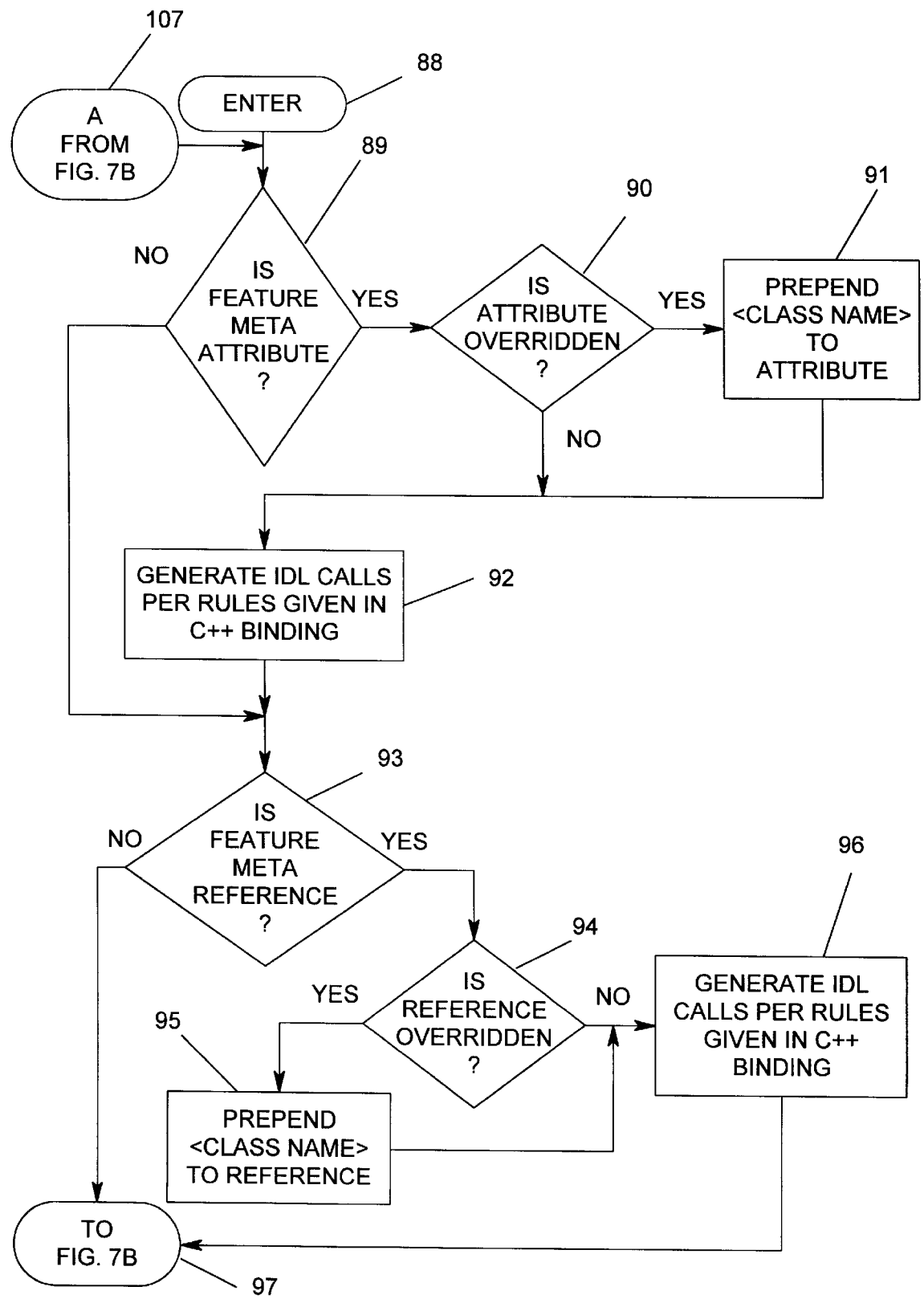
FIGS. 7A and 7B combined form a flow chart illustrating the routine to generate IDL calls.

Referring now to FIG. 6A, the detail process steps for generating IDL interfaces is shown. The process begins with an enter bubble 62, followed by a process step of generating "interface" with inheritance (block 63). That is, this process step goes through each class of the model and determines the inheritance—i.e., which class inherits behavior from what other class or classes. It is pointed out that multiple inheritance is supported. Next, a process step of generating "find" calls is performed (block 64). This is a detail feature required by the repository and is not part of the metadata. "Find" calls allow the user to collect instances of attributes by name. The details of this process step are illustrated in FIG. 6B and are amplified further hereinbelow. Following this, a process step of generating IDL calls is performed (block 65). Details of this process step are illustrated in FIG. 7A and are described further hereinafter. An inquiry is next made as to whether or not there are more classes in the model (diamond 66). If the answer is yes then a return is made back to the process block 63 to repeat the process. Once all of the classes in the model have been processed then an exit is taken from the No leg of the diamond 66 to an exit bubble 67.

Referring now to FIG. 6B, details of a routine generate IDL "find" files are illustrated. The process begins with an enter bubble 68 followed by an inquiry as to whether or not there are more meta attributes in the class (diamond 69). If the answer to this inquiry is No, then an exit is taken from this routine to bubble 70. On the other hand, if the answer to this inquiry is Yes, then another inquiry is made as to whether or not this is an index key attribute (diamond 71). If the answer to this inquiry is Yes, then a process step of generating "find_<attribute>_ name" is performed (block 72). This step allows instances of attributes that are index keys to be retrieved by name. After this step has been performed, or if the answer to the inquiry in the diamond 71 is No, then another inquiry is made as to whether or not this is a string attribute (diamond 73). If the answer to this inquiry is Yes then a process step of generating "find_ string" call is performed (block 74). Once this step has been performed or if the answer to the inquiry in the diamond 73 is No, then still another inquiry is made as to whether or not this is a text attribute (diamond 75). If the answer to this inquiry is Yes, then a process step of generating "find_text" call is performed (block 76). Once this step has been performed or if the answer to the inquiry in the diamond 75 is No, then yet another inquiry is made as to whether or not this is a blob attribute (diamond 77).

Figure 6C:
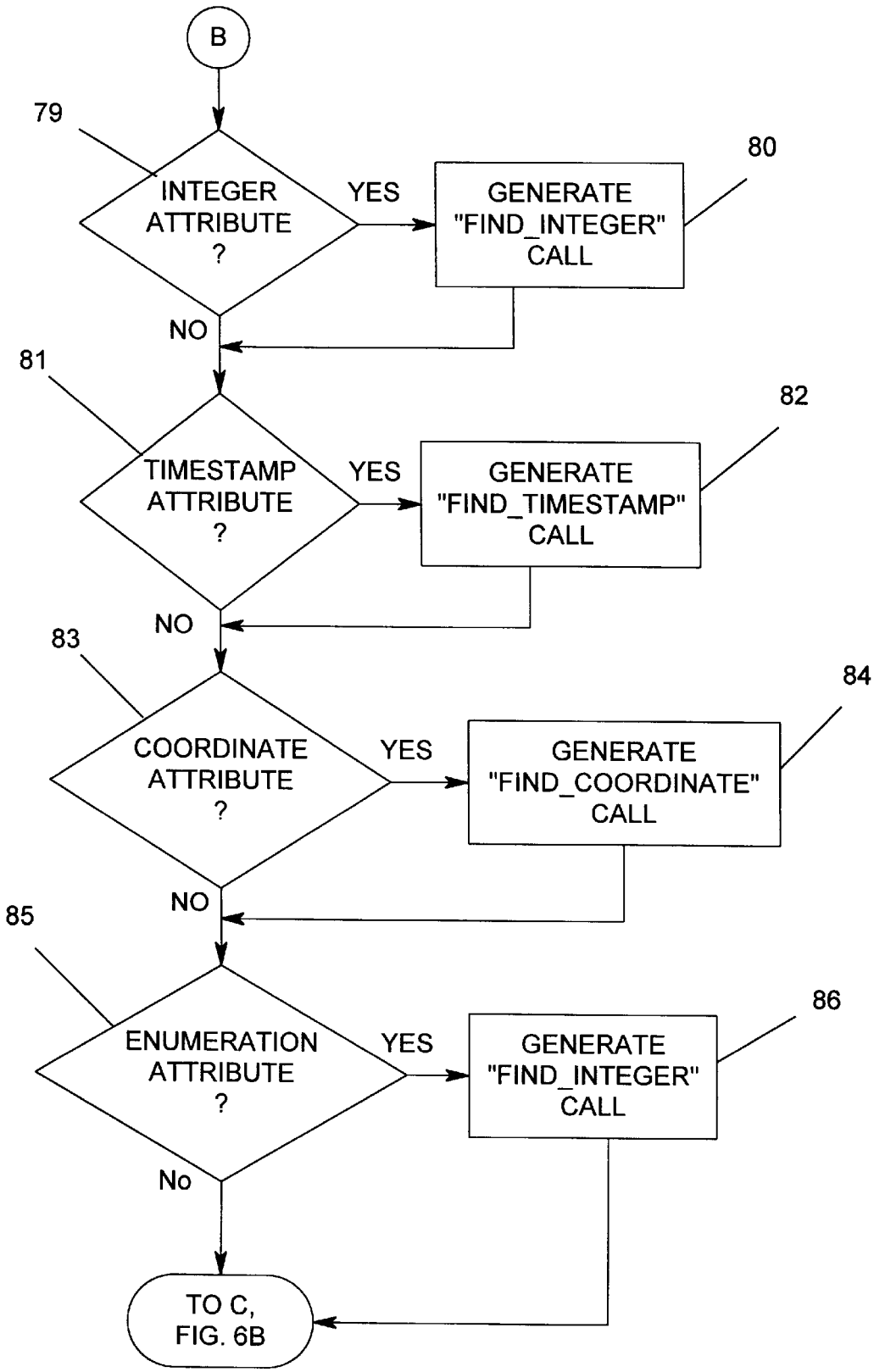

If the answer to the inquiry in the diamond 77 is Yes, then a process step of generating "find_blob" call is performed (block 78). Once this process step is complete or if the answer to this inquiry is No, then a branch is made to FIG. 6C (via a connector B) wherein another inquiry is made as to whether or not this is an integer attribute (diamond 79). If the answer to this inquiry is Yes, then a process step of generating "find_integer" call is performed (block 80). Once this process step is complete or if the answer to this inquiry is No, then yet another inquiry is made as to whether or not this is a timestamp attribute (diamond 81). If the answer to this inquiry is Yes, then a process step of generating "find_timestamp" call is performed (block 82). Once this step has been performed or if the answer to this inquiry is No, still another inquiry is made as to whether or not this is a coordinate attribute (diamond 83). If the answer to this inquiry is Yes, then a process step of generating "find_ coordinate" call is performed (block 84). Once this process step has been performed or if the answer to the inquiry in the diamond 83 is No, the another inquiry is made as to whether or not this is an enumeration attribute (diamond 85). If the answer to this inquiry is Yes, then a process step of generating "find_integer" call is performed (block 86). Once this step has been performed or if the answer to this inquiry is No, then a return is made (via a connector C) to the diamond 69 inquiring if more meta attributes are in the class.

Referring now to FIG. 7A, the first of a two-part diagram illustrates the steps for generating IDL calls. The process begins with an enter bubble 88 followed by an inquiry as to whether or not the feature is a meta attribute (diamond 89). If the answer to this inquiry is Yes, then another inquiry is made as to whether or not the attribute is overridden (diamond 90). If the answer to this inquiry is Yes, then a process step of prepending <class_name> to the attribute is performed (block 91). This is done because IDL, as defined, does not support overriding (i.e., one class re-defining a method that it inherited from another class) The <class name> is prepended to differentiate the call from the one it overrides, as Urep and OLE does to support overriding. Once this step has been performed or if the answer to the inquiry in the diamond 90 is No, then a process step of generating IDL calls per the rules given in C++ binding is performed (block 92). Different attribute types generate different methods to access/modify the attribute. An attribute that is read-only requires an access method. Next, an inquiry is made as to whether or not the feature is a meta reference (diamond 93). If the answer to this inquiry is Yes, then another inquiry is made as to whether or not the reference is overridden (diamond 94). If the answer to this inquiry is Yes, then a process step of prepending <class_name> is performed (block 95). Following this, or if the answer to the inquiry in the diamond 94 is No, a process step of generating IDL calls per the rules given in C++ binding is performed (block 96). After this step, or if the answer to the inquiry in the diamond 93 is No, a branch is taken to remainder of this routine illustrated in FIG. 7B as denoted by a connecting tag 97.

Figure 7B:
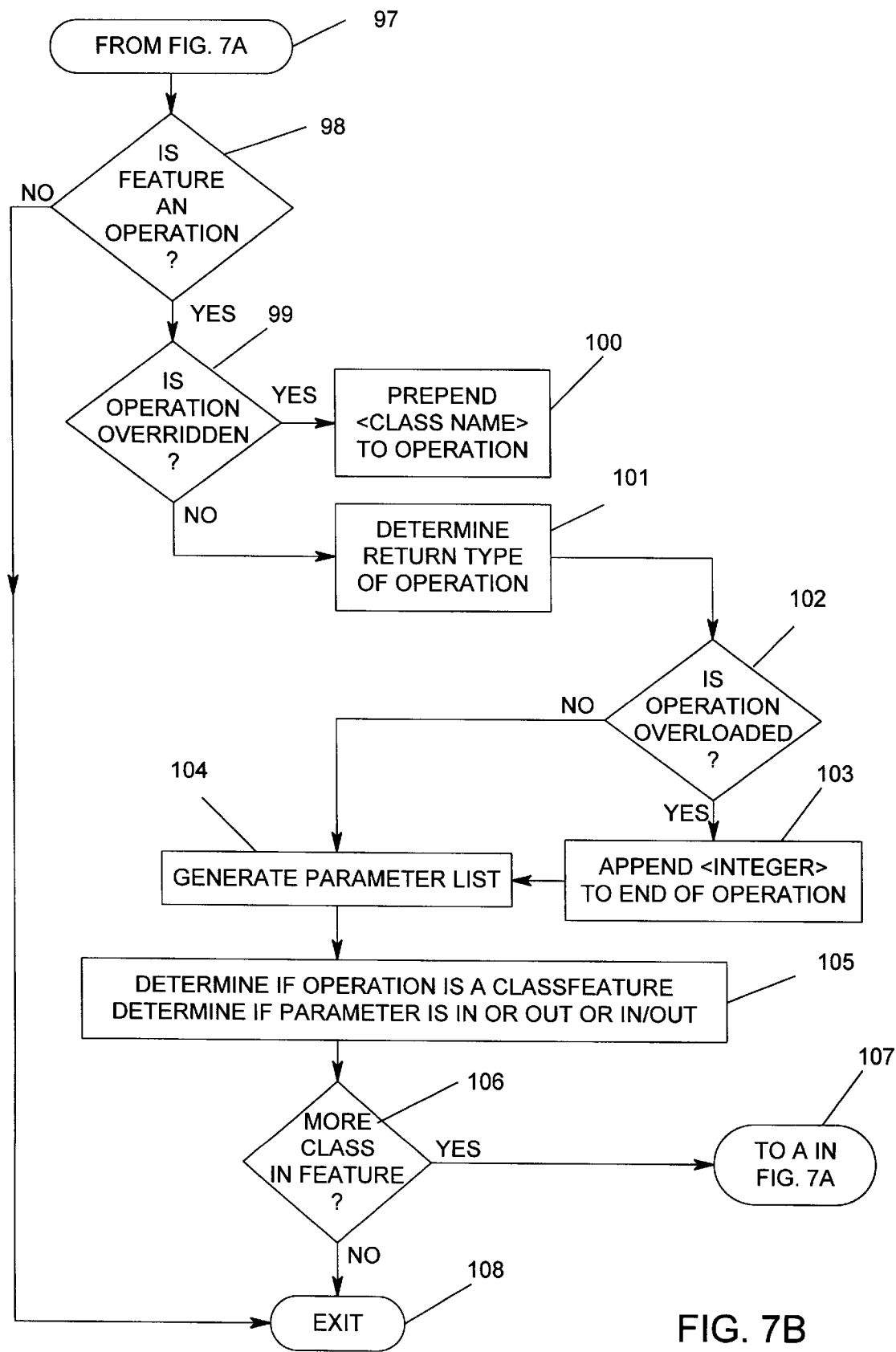

Referring now to FIG. 7B, the second part of the process for generating IDL calls is shown. From the connecting tag 97, an inquiry is made as to whether or not the feature is an operation (diamond 98). If the answer to this inquiry is Yes, then another inquiry is made as to whether or not the operation is overridden (diamond 99). If the operation is overridden then a process step of prepending <class_name> to the operation is performed (block 100). Once this step is performed, or if the operation is not overridden, a process step of determining return type of operation is performed (block 101). Next, an inquiry is made as to whether or not the operation is overloaded (diamond 102). If the answer to this inquiry is Yes, then a process step of appending <integer> to the end of the operations is performed (block 103). This is done because OLE automation does not support overloading (where a method can be called by the same name but with different parameter lists). This allows the same method to perform differently based on its signature. Thus, an overloaded method "A" appears in OLE automation as "A1, A2 . . . ". Once this step has been performed, or if the answer to the inquiry in the diamond 102 is No, then a process step of generating the parameter list for the method is performed (block 104). Next, a process step of determining if the operation is a class feature and determining if the parameter is in or out or in/out (block 105). A class feature is a method that can operate on the class itself and does not require an instance of that class. Parameters in IDL can be input ("in"), output only ("out") and both input and output ("in/out").

Following this, an inquiry is made as to whether or not there are more class in feature (diamond 106). If the answer to this inquiry is Yes, then a return is made back to the diamond 89 in FIG. 7A as depicted by a connection tag 107. If the answer to this inquiry is No, then an exit is taken (bubble 108). Returning to the inquiry diamond 98 briefly, if the answer to this inquiry is No, then a branch is taken to the diamond 106.

Figure 9A:
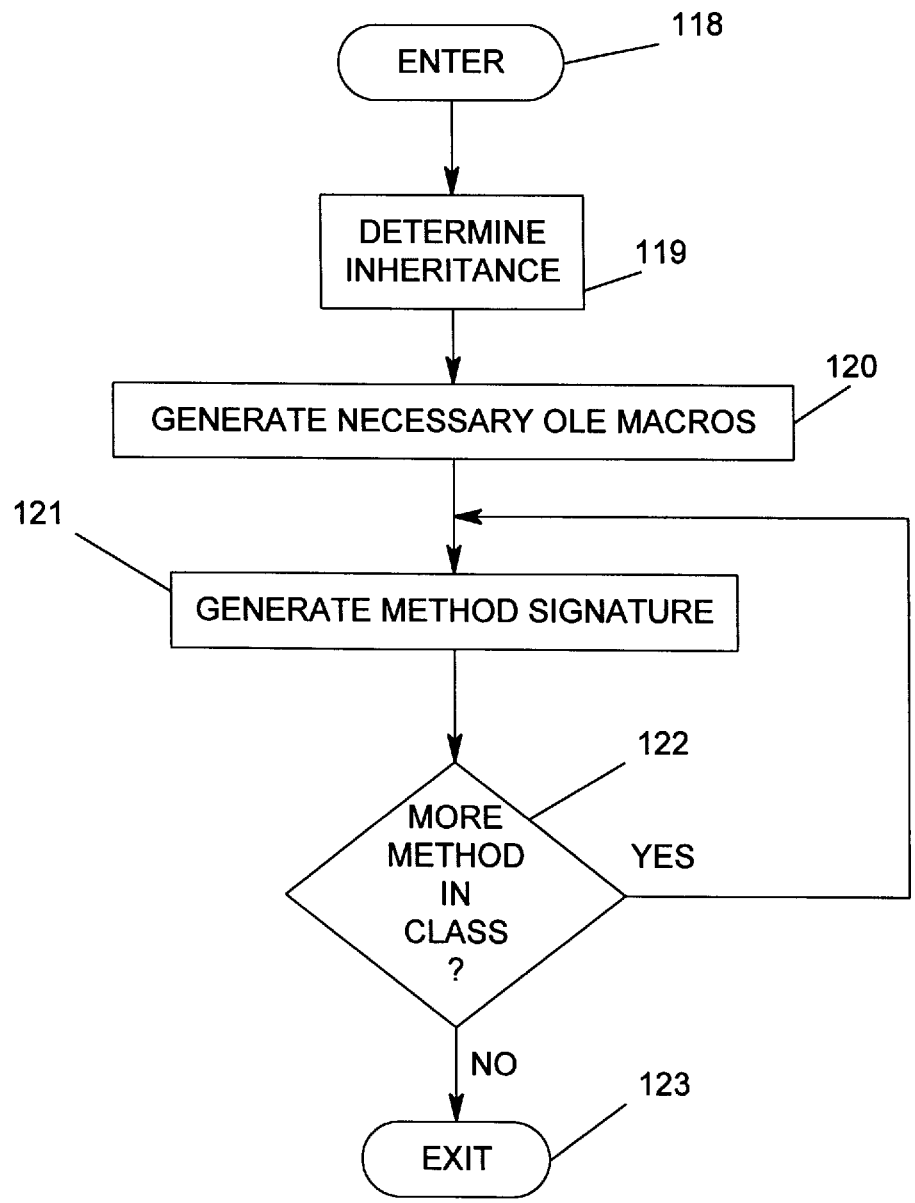
FIG. 9A is a flow chart illustrating the routine to generate OLE header files.
Figure 9B:
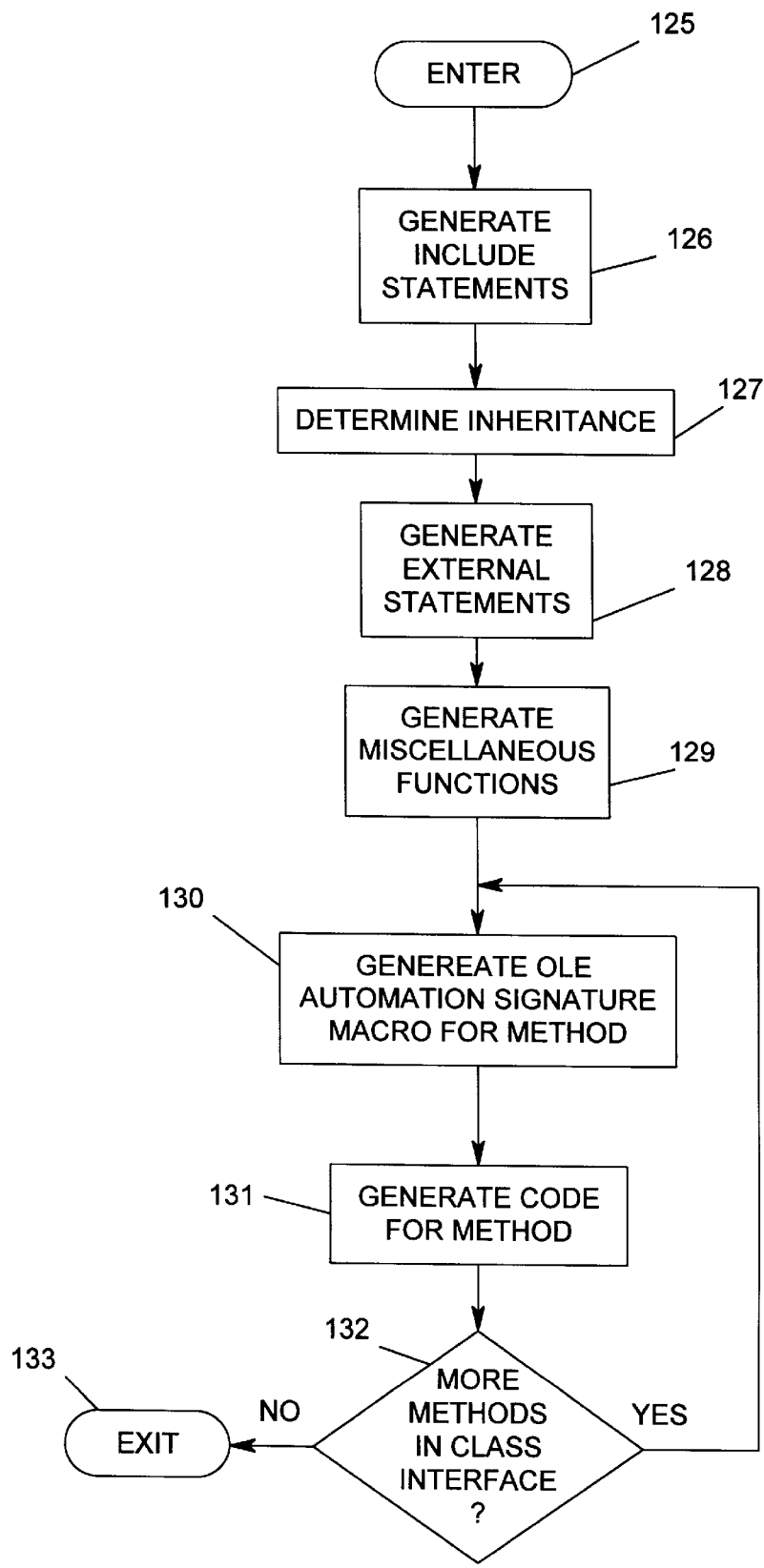
FIG. 9B is a flow chart illustrating the routine to generate OLE code files.

Referring now to FIG. 8, details of the routine to generate OLE are illustrated in flow-chart form. The process begins with an enter bubble 110 followed by a process step of setting up data type mapping for mapping repository data types to OLE data types (block 111). Next, a process step of generating OLE header files is performed (block 112). The details of this process step are illustrated in FIG. 9A and described further hereinafter. Following this, a process step of generating OLE C++ files is performed (block 113). The details of this step are illustrated in FIG. 9B and described further hereinafter.

Next, another process step of generating ORB independent header files is performed (block 114). The ORB independent header files present the same interface to the automation classes—regardless of the ORB used underneath. Note that the underlying interoperability can be provided by something other than an ORB, e.g., by a lower level interface such as Windows sockets or by a higher-level interface such as the Urep interoperability layer. Once this step is complete, yet another process step of generating ORB specific C++ files is performed (block 115). Although the ORB code here is specific to each ORB, the generation code is designed in such a way as to make adding new ORB's quite easy.

An inquiry is next made as to whether or not there are more classes in the model (diamond 116). If the answer to this inquiry is Yes, then the process steps denoted by the blocks 112 through 115 are repeated until there are no more classes in the model. Once this has been accomplished (No branch from the diamond 116) then an exit is taken from this routine as denoted by an exit bubble 117.

Referring now to FIG. 9A, the routine for generating OLE C++ header files is illustrated. The routine begins with an enter bubble 118, followed by a process step of determining the class in which inheritance is performed (block 119). As alluded to hereinabove, classes may inherit from one or more other classes. Thus, it is necessary to determine the class inheritance before proceeding further. Next, a process step of generating the necessary OLE macros is performed (block 120). These are required by the Microsoft Foundation Classes ("MFC") to properly define the class for automation. Following this step, another process step of generating a method signature is performed (block 121). A method signature is its parameter list. An inquiry is next made as to whether or not there are more methods in the class (diamond 122). If the answer to this inquiry is Yes, then the process step depicted by the block 121 is repeated until all methods in the class have been processed. On the other hand, if the answer to this inquiry is No, then an exit is taken from this routine (bubble 123).

Referring now to FIG. 9B, the routine for generating OLE C++ code is illustrated. The routine begins with an enter bubble 125, followed by a process step of generating include statements (block 126). Include statements bring in C++ OLE header files for automation or interface classes referenced in the code for this class and is required to properly compile. Next, a process step of determining inheritance is performed (block 127). This process step is the same as the process step depicted by the block 119 (FIG. 9A) and described hereinabove. Following this, a process step of generating external statements is performed (block 128). External statements define data defined outside this class and are necessary to properly compile.

Another process step of generating miscellaneous functions is next performed (block 129). An exemplary miscellaneous function is a C++ constructor and destructor and is used to create and destroy automation classes. A process step of generating OLE automation signature macros for the method is performed (block 130). That is, the automation signature macros are used by MFC to build information to properly describe the method to OLE automation. Next, a process step of generating code for the method is performed (block 131), which code interfaces to the corresponding interface class. An inquiry is next made as to whether or not there are more methods in the class interface (diamond 132). If the answer to this inquiry is Yes, then the process steps depicted by the blocks 130 and 131 are repeated until there are no more methods in the class. Finally, an exit is taken from this routine as depicted by a bubble 133.

Example of a Visual Basic Coding

This program opens the TEST repository and prints to the debug screen all the subclasses of UrepPersistentObject, which demonstrates how the OLE method of the present invention is used.

```
Dim Factory As Object
Dim Urep As Object
Dim MetaClassSet As Object
Dim MetaClass As Object
Set Factory = Createobject("RSMFactory")
Set Urep = Factory.createuREP
If (not Urep.open("", "", "", "", "TEST") =
False)then,
End
Set MetaClassSet = Factory.create("UrepMetaClass", Urep)
                                      .getByName(Urep,
"UreppersistentObject", "RSM")
                                      .getSubclasses
For I = 0 To MetaClassSet.size-1
    Set MetaClass = MetaClassset.lookup(I)
    Debug.Print MetaClass.getModel.getPrefix
    Debug.Print Metaclass.getName2
    Set MetaClass = Nothing
Next I
Set MetaClassSet = Nothing
Urep.endSession(True)
Urep.logout
Urep.closeRepository
Set Urep = Nothing
End
```

Notes.

No overloading and no underscores are allowed in automation, so get_name in the Urep API becomes getName2.

Set X=Nothing destructs the object X.

Other models are loaded by calling CreateObject on their factories.

Example of OLE Automation Class

The following files are the header and C++ automation class files for the Employee class in the PM model. OLE classes and macros defined in Microsoft Foundation Classes (MFC) are used. The IDL for the Employee class is given below, where the Employee class in the repository has one multivalued reference (to the Class Task) called Tasks, and two operations: construct and destruct. Employee inherits from UrepUser.

```
interface iEmployee : iUrepuser {
PMSet /*Task*/ get_tasks(in InteropHandle handle);
    Task get_tasks_loc(in InteropHandle handle, in Task
location);
    udt_boolean contains_tasks(in InteropHandle handle,
in Task object);
    udt_integer size_tasks(in InteropHandle handle);
    udt_boolean isNull_tasks(in InteropHandle handle);
    void set_tasks(in InteropHandle handle, in PMSet
/*Task*/ value);
    void add_tasks(in InteropHandle handle, in Task
object);
    void remove_tasks(in InteropHandle handle, in Task
object);
    void remove_tasks_loc(in InteropHandle handle, in
UrepInteger location);
    void flush_tasks(in InteropHandle handle);
    void Employee_construct(in InteropHandle handle,
    in UrepId initName,
    inout UrepNamespace initNamespace,
    in UrepId initLoginId
    );
```

```
        void Employee_destruct(in InteropHandle handle,
            in UrepReferenceProcessing freeMode
            );
    };
```

Notes.

PMSet is derived from UrepSet and handles the template types for the PM Model.

When a collection is returned by an interface method or passed in as a parameter, the template class name is generated as a comment. This is used by the generation tool when generating automation class and server class code. Although not shown, the IDL also contains enumerations from the model.

```
The .h File is given below:
#ifndef _aEmployee_h_
#define _aEmployee_h_
#include _UrepObject_h_
#include _UrepPersistentObject_h_
#include _UrepNamedObject_h_
#include _UrepUsersObject_h_
#include _UrepUser_h_
class aEmployee : public aUrepUser {
    DECLARE_DYNCREATE (aEmployee)
private:
    void InitIfNecessary( );
public:
    aEmployee( );
    virtual ~aEmployee( );
    virtual void OnFinalRelease( );
afx_msg LPDISPATCH get_tasks( );
    afx_msg LPDISPATCH get_tasks_loc(LPDISPATCH
location);
    afx_msg BOOL contains_tasks(LPDISPATCH object);
    afx_msg long size_tasks( );
    afx_msg BOOL isNull_tasks( );
    afx_msg void set_tasks(LPDISPATCH value);
    afx_msg void add_tasks(LPDISPATCH object);
    afx_msg void remove_tasks(LPDISPATCH object);
    afx_msg void remove_tasks_loc(long location);
    afx_msg void flush_tasks( );
    afx_msg void construct(
        BSTR initName,
        LPDISPATCH initNamespace,
        BSTR initLoginId
        );
    afx_msg void destruct(short freeMode);
    DECLARE_DISPATCH_MAP( )
    };
#endif
```

Notes.

The DECLARE_DYNCREATE macro allows the MFC framework to dynamically create this class at runtime. (It needs to know the inheritance to support.) The macro DECLARE_DISPATCH_MAP is defined in MFC. The dispatch map macro maps the interface definitions above it into automation calls.

BSTR is the OLE automation string type.

LPDISPATCH is the OLE automation dispatch pointer.

The base class for RSM is CCmdTarget, an OLE enabled MFC class.

The .cpp File is given below:

```
#include "stdafx .h"
#include <time.h>
#include <string.h>
#include "PM.hh"            /* The include file for the
interface classes */
#include "PM.h"
#include _PMSet_h_
#include _Task_h_
#include _UrepNamespace_h_
#include _Einployee_h_
#ifdef _DEBUG
#undef THIS_FILE
static char BASED_CODE THIS_FILE[ ] = __FILE__;
#endif
iEmployee *gEmployee = NULL;   /* The global interface
pointerfor Employee */
extern iPMProxy *gPMProxy;      /* The proxy interface
pointer for PM model */
IMPLEMENT_DYNCREATE ( aEmployee, aUrepUser)
aEmployee::aEmployee()
{
    EtnableAutomation();           /* Inherited from
CCmdTarget */
}
aEmployee::~aEmployee ()
{
}
void aEmployee::OnFinalRelease()    /* OLE destructor
inherited from CCmdTarget */
{
    destructObject (handle);
    delete this;
}
void aEmployee::InitIfNecessary()
{
    if (gEmployee == NULL)
        gEmployee = newnewEmployee(gPMProxy);
}
BEGIN_DISPATCH_MAP(aEmployee, aUrepUser)
/* The DISP_FUNCTION defines the automation interface for
the class by giving the method name as it is known to
automation ("getTasks"), the method name as defined in
the class body ("get_tasks"), the return value
(VT_DISPATCH) and the parameter list (VTS_NONE). */
DISP_FUNCTION(aEmployee, "getTasks", get_tasks,
VT_DISPATCH, VTS_NONE)
DISP_FUNCTION(aEmployee, "getTasksLoc", get_tasks_loc,
VT_DISPATCH, VTS_DISPATCH)
DISP_FUNCTION(aEmployee, "containsTasks", contains_tasks,
VT_BOOL, VTS_DISPATCH)
DISP_FUNCTION(aEmployee, "sizeTasks", size_tasks, VT_14,
VTS_NONE)
DISP_FUNCTION(aEmployee, "isNullTasks", isNull_tasks,
VT_BOOL, VTS_NONE)
DISP_FUNCTION(aEmployee, "setTasks", set_tasks, VT_EMPTY,
VTS_DISPATCH)
DISP_FUNCTION(aEmployee, "addTasks", add_tasks, VT_EMPTY,
VTS_DISPATCH)
DISP_FUNCTION(aEmployee, "removeTasks", remove_tasks,
VT_EMPTY, VTS_DISPATCH)
DISP_FUNCTION(aEmployee, "removeTasksLoc",
remove_tasks_loc, VT_EMPTY, VTS_I4)
DISP_FUNCTION(aEmployee, "flushTasks", flush_tasks,
VT_EMPTY, VTS_NONE)
DISP_FUNCTION(aEmployee, "construct", construct,
VT_EMPTY, VTS_BSTR VTS_DISPATCH
VTS_BSTR)
DISP_FUNCTION(aEmployee, "destruct≤", destruct, VT_EMPTY,
VTS_I2)
END_DISPATCH_MAP ()
LPDISPATCH aEmployee::get_tasks_loc (LPDISPATCH location)
{
    InitIfNecessary();
    aTask *p1Task = (aTask *)FromIDispatch(location);
    aTask *pR = new aTask;
    pR->handle = gEmployee->get_tasks_loc(
        handle,
        p1Task->handle
        );
    return (pR->GetIDispatch(FALSE));
}
BOOL aEmployee::contains_tasks (LPDISPATCH object)
{
    InitIfNecessary();
    aTask *p1Task = (aTask *)FromIDispatch(object);
```

-continued

```
        return (gEmployee->contains_tasks(
        handle,
        p1Task->handle
        ));
}
long aEmployee::size_tasks()
{
        InitIfNecessary();
        return (gEmployee->size_tasks(handle));
}
BOOL aEmployee::isNull_tasks()
{
        InitIfNecessary();
        return (gEmployee->isNull_tasks(handle));
}
void aEmployee::set_tasks(LPDISPATCH value)
{
        InitIfNecessary();
        aPMSet *p1PMSet = (aPMSet *)FromIDispatch(value);
        gEmployee->set_tasks
        handle,
        p1PMSet ->handle
        );
}
void aEmployee::add_tasks(LPDISPATCH object)
{
        InitIfNecessary();
        aTask *p1Task = (aTask *)FromIDispatch(object);
        gEmployee->add_tasks
        handle,
        p1Task->handle
        );
}
void aEmployee::remove_tasks(LPDISPATCH object)
{
        InitIfNecessary();
        aTask *p1Task = (aTask *)FromIDispatch(object);
        gEmployee->remove_tasks
        handle,
        p1Task->handle
        );
}
void aEmployee::remove_tasks_loc(long location)
{
        InitIfNecessary();
        gEmployee->remove_tasks_loc(
        handle,
        location
        );
}
void aEmployee::flush_tasks()
{
        InitIfNecessary();
        gEmployee->flush_tasks(handle);
}
void aEmployee::construct(
        BSTR initName,
        LPDISPATCH initNamespace,
        BSTR initLoginId
        )
{
        InitIfNecessary();
        aUrepNamespace *p2UrepNamespace = (aUrepNamespace
*)FromIDispatch(initNamespace);
        gEmployee->Employee_construct(
        handle,
        initName,
        p2UrepNamespace->handle,
        initLoginId
        );
}
void aEmployee::destruct(short freeMode)
{
        InitIfNecessary();
        gEmployee->Employee_destruct(
        handle,
        (UrepReferenceprocessing)freeMode
        );
}
```

While the invention has been particularly shown and described with references to preferred embodiments thereof, it will be understood by those skilled in the art that various changes in form and details may be made therein without departing from the spirit and scope of the invention as defined by the appended claims.

APPENDICES

Appendix A:
OLE/ORB Generation
Generate IDL
Generate OLE
Generate Server {Specific to dRB}
Appendix B:
Generate IDL
    Open Repository
    Include required models
    Generate Data Types         {String, enumerations, etc. }
    Generate Forward References     {so IDL will compile}
    Generate Factory and Proxy
    If model is RSM
        Generate Non-Persistent Classes     {not in meta data}
    Else
        Generate Sub-Model Collections     {discussed hereinbelow}
    Generate IDL Interfaces
        split IDL file into classes
        run vendor's IDL compiler for each class
Appendix C:
for each class in Model
    generate "interface" with inheritance
    generate IDL "Find" calls
    generate IDL calls
end if
Generate IDL "Find" Calls
for each meta attribute in class
    if index key attribute
        generate "find_<attribute_name>"
    if string attribute, then generate "find_string" call
    if Text attribute then generate "find_text" call
    if Blob attribute then generate "find_Blob" call
    if Integer attribute then generate "find_integer" call
    if Timestamp attribute then generate "find_time stamp" call
    if Coordinate attribute then generate "find_coordinate" call
    if Enumeration attribute then generate "find_integer" call
end if
Appendix D:
Generate IDL Calls
for each class feature
    if feature is meta attribute
        determine if attribute is overriden
        if attribute is overriden
            prepend <class name> to attribute
        generate IDL calls per rules given in C++ binding
end if
if feature is meta reference
    if model is not RSM
        determine if reference is overridden
    if reference is overridden
        prepend <class name> to reference
    generate IDL calls per rules given in C++ binding
    end if
if feature is an operation
    determine if operation overridden
    if operation is overridden
        prepend <class name> to operation
    determine return type of operation
    if operation is overloaded
        append _<integer> to end of operation
    generate parameter list (b

-continued

APPENDICES

```
        {determine if operation is a ClassFeature}
        {determine if parameter is in or out or in/out}
    end if
    endfor
Appendix E:
Generate OLE
    setup data type mapping array for mapping data types
        Urep data types to OLE data types
    for each class in Model (from IDL)
        generate OLE header file
    generate OLE C++ file
    endif
    for each class in Model
        generate ORB specific header file
        generate ORB specific C++ file
    endif
Appendix F:
Generate OLE header file
    determine inheritance
    generate necessary OLE macros
        for each method in class interface
            generate method signature
        endif
Generate OLE C++ file
    generate include statements
    determine inheritance
    generate extern statements
    generate misc. functions
    for each method in class interface
        generate OLE automation signature macro for
method
    endif
    for each method in class interface
        generate code for method
    {add template inf ormation for collections}
    endif
```

What is claimed is:

1. In a computer system having a server including a CPU and a memory, a client including a CPU and a memory and a local area network connected therebetween, a repository program operating in said server and a method operating in said client for generating OLE automation in said client and IDL interfaces for each of said server and said client, said method comprising the steps of:

a. generating IDL from metadata information about models within said repository program;

b. generating OLE automation from said IDL independently of ORB and without involving ORB;

c. generating server software from said IDL so that no user written code is required;

d. setting up data type mapping for mapping repository data types to OLE data types and generating code to map those data types properly;

e. generating OLE header files;

f. generating OLE C++ files;

g. determining if there are more classes in a current one of said models, and if so;

h. repeating steps e and f above until there are no more classes in said current model;

i. generating ORB independent header files; and, j. generating ORB specific C++ files.

2. The method as in claim 1 wherein said step of generating said IDL further comprises the steps of:

k. including required models within said repository program;

l. generating data types;

m. generating forward references;

n. generating proxy and factory;

o. determining if a current one of said models is a repository service model, and if so generating non-persistent classes;

p. if said current model is not a repository service model, then generating sub-model collections;

q. generating IDL interfaces for all classes in said current model;

r. splitting IDL files into classes; and, s. compiling each class.

3. The method as in claim 2 wherein said step of generating IDL interfaces further comprises the steps of:

t. generating interface with inheritance;

u. generating IDL find files;

v. generating IDL calls;

w. inquiring if there are more classes in said model, and if so;

x. repeating all of the steps above until there are no more classes in said model.

4. The method as in claim 3 wherein said step of generating IDL calls further comprises the steps of:

y. inquiring if feature is a meta attribute, and if so;

z. determining if attribute is overridden, and if so;

aa. prepending "<class name>" to attribute;

ab. generating IDL calls per rules given in C++ binding;

ac. inquiring if feature is a meta reference, and if so;

ad. determining if reference is overridden, and if so;

ae. prepending "<class name>" to said reference; and, af. if said reference is not overridden, generating IDL calls per rules given in C++ binding.

5. The method as in claim 4 further including the steps of:

ag. inquiring if feature is an operation, and if so;

ah. determining if feature is overridden, and if so;

ai. prepending "<class name>" to said operation;

aj. determining return type of operation;

ak. inquiring if operation is overloaded, and if so;

al. appending "<integer>" to end of operation;

am. generating parameter list;

an. determining if operation is a classfeature;

ao. determining if parameter is in/out;

ap. inquiring if there are more classes in feature, and if so;

aq. returning to step y of claim 4.

6. The method as in claim 2 wherein said step of generating IDL find files further comprises the steps of:

t. inquiring if there are more meta attributes in class, and if so;

u. inquiring if said attribute is an index key, and if so;

v. generating "find_<attriubte name>" call;

w. inquiring if said attribute is a string attribute, and if so;

x. generating "find_string" call;

y. inquiring if said attribute is a text attribute, and if so;

z. generating "find_text" call;

aa. repeating the steps above for each meta attribute found in step a hereof.

7. The method as in claim 1 wherein said step of generating OLE header files further comprises the steps of:

k. determining inheritance;

l. generating necessary OLE macros;

m. generating method signature; and, n. inquiring if there are more methods in class, and if so:
o. repeating step m above until there are no more methods in class.

8. The method as in claim 1 wherein said step of generating OLE C++ files further includes the steps of:
k. generating include statements;
l. determining inheritance;
m. generating external statements;
n. generating miscellaneous functions;
o. generating OLE automation signature macro for method;
p. generating code for method;
q. inquiring if there are more methods in class interface, and if so;
r. repeating said steps o and p hereinabove until there are no more methods in class interface.

9. In a computer system having a server including a CPU and a memory, a client including a CPU and a memory and a local area network connected therebetween, a repository program operating in said server and a method operating in said client for generating OLE automation in said client and IDL interfaces for each of said server and said client, said method comprising the steps of:
a. generating IDL from metadata information about models within said repository program by:
i) including required models within said repository program;
ii) generating data types;
iii) generating forward references;
iv) generating proxy and factory to handle object creation and to house static functions;
v) determining if a current one of said models is a repository service model, and if so generating non-persistent classes;
vi) if said current model is not a repository service model, then generating sub-model collections to handle C++ template interfaces (not available in OLE);
vii) generating base classes to allow compiling independently of any dependent models and to bind to dependent models at run time;
viii) generating IDL interfaces for all classes in said current model;
ix) splitting IDL files into classes and removing inheritance to support said method (passing class handle through one ORB object);
x) compiling each class;
b. generating OLE automation from said IDL independently of ORB and without involving ORB by:
i) setting up data type mapping for mapping repository data types to OLE data types and generating code to map those data types properly;
ii) generating OLE header files;
iii) generating OLE C++ files;
iv) determining if there are more classes in a current one of said models, and if so;
v) repeating steps b and c above until there are no more classes in said current model;
vi) generating ORB independent header files;
vii) generating ORB specific C++ files; and,
c. generating server software from said IDL so that no user written code is required by:
i) determining inheritance and mapping single and multiple inheritance correctly onto OLE;
ii) generating necessary OLE macros;
iii) generating method signature; and,
iv) inquiring if there are more methods in class, and if so;
v) repeating steps c.iii) and c.iv) above until there are no more methods in said class.

10. The method as in claim 9 wherein said step of generating OLE header files further comprises the steps of:
d. determining inheritance;
e. generating necessary OLE macros;
f. generating method signature; and,
g. inquiring if there are more methods in class, and if so:
h. repeating step f above until there are no more methods in class.

11. The method as in claim 9 wherein said step of generating OLE C++ files further includes the steps of:
d. generating include statements;
e. determining inheritance;
f. generating external statements;
g. generating miscellaneous functions;
h. generating OLE automation signature macro for method;
i. generating code for method;
j. inquiring if there are more methods in class interface, and if so;
k. repeating said steps h and i hereinabove until there are no more methods in class interface.

12. The method as in claim 9 wherein said step of generating IDL interfaces further comprises the steps of:
d. generating interface with inheritance;
e. generating IDL find files;
f. generating IDL calls;
g. inquiring if there are more classes in said model, and if so;
h. repeating all of the steps above until there are no more classes in said model.

13. The method as in claim 12 wherein said step of generating IDL calls further comprises the steps of:
i. inquiring if feature is a meta attribute, and if so;
j. determining if attribute is overridden, and if so;
k. prepending "<class name>" to attribute;
l. generating IDL calls per rules given in C++ binding;
m. inquiring if feature is a meta reference, and if so;
n. determining if reference is overridden, and if so;
o. prepending "<class name>" to said reference; and,
p. if said reference is not overridden, generating IDL calls per rules given in C++ binding.

14. The method as in claim 13 further including the steps of:
q. inquiring if feature is an operation, and if so;
r. determining if feature is overridden, and if so;
s. prepending "<class name>" to said operation;
t. determining return type of operation;
u. inquiring if operation is overloaded, and if so;
v. appending "<integer>" to end of operation;
w. generating parameter list;
x. determining if operation is a classfeature;
y. determining if parameter is in/out;
z. inquiring if there are more classes in feature, and if so;
aa. returning to step i of claim 13.

15. The method as in claim 9 wherein said step of generating IDL find files further comprises the steps of:

d. inquiring if there are more meta attributes in class, and if so;
e. inquiring if said attribute is an index key, and if so;
f. generating "find_<attriubte_name>" call;
g. inquiring if said attribute is a string attribute, and if so;
h. generating "find_string" call;
i. inquiring if said attribute is a text attribute, and if so;
j. generating "find_text" call;
k. repeating the steps above for each meta attribute found in step a hereof.

* * * * *

UNITED STATES PATENT AND TRADEMARK OFFICE
CERTIFICATE OF CORRECTION

PATENT NO. : 5,848,273

DATED : December 8, 1998

INVENTOR(S) : James A. Fontana, et al

It is certified that error appears in the above-identified patent and that said Letters Patent is hereby corrected as shown below:

On the title page, item [75] Inventors: please add the following inventor –Paul Donald Koerber, Fountain Valley, CA.--.

Signed and Sealed this

Thirtieth Day of March, 1999

Attest:

Q. TODD DICKINSON

Attesting Officer

Acting Commissioner of Patents and Trademarks